United States Patent
Nun et al.

(10) Patent No.: US 8,163,351 B2
(45) Date of Patent: Apr. 24, 2012

(54) METHOD FOR COATING SUBSTRATES WITH COATING SYSTEMS CONTAINING REACTIVE HYDROPHOBIC INORGANIC FILLERS

(75) Inventors: Edwin Nun, Billerbeck (DE); Heike Bergandt, Marl (DE)

(73) Assignee: Evonik Degussa GmbH, Essen (DE)

( * ) Notice: Subject to any disclaimer, the term of this patent is extended or adjusted under 35 U.S.C. 154(b) by 404 days.

(21) Appl. No.: 12/067,855

(22) PCT Filed: Oct. 5, 2006

(86) PCT No.: PCT/EP2006/067090
§ 371 (c)(1),
(2), (4) Date: Mar. 24, 2008

(87) PCT Pub. No.: WO2007/051682
PCT Pub. Date: May 10, 2007

(65) Prior Publication Data
US 2008/0261032 A1    Oct. 23, 2008

(30) Foreign Application Priority Data
Nov. 3, 2005  (DE) .......................... 10 2005 052 938

(51) Int. Cl.
B05D 3/02    (2006.01)
(52) U.S. Cl. .................. 427/387; 427/376.2; 427/388.1; 427/389.7; 427/389.9; 427/393; 427/393.5; 427/393.6; 427/394; 427/397
(58) Field of Classification Search .................. None
See application file for complete search history.

(56) References Cited

U.S. PATENT DOCUMENTS

| | | | |
|---|---|---|---|
| 6,403,164 B1 * | 6/2002 | Jonschker et al. ............ | 427/387 |
| 6,635,735 B1 | 10/2003 | Zhang et al. | |
| 6,695,904 B2 * | 2/2004 | Burger et al. ............ | 106/287.14 |
| 6,699,586 B2 * | 3/2004 | Edelmann et al. ............ | 428/447 |
| 7,250,080 B1 * | 7/2007 | Craig et al. .................... | 106/445 |
| 2001/0024719 A1 | 9/2001 | Lewis | |
| 2003/0069350 A1 * | 4/2003 | Yoshihara et al. ............ | 524/588 |
| 2004/0131867 A1 | 7/2004 | Bier et al. | |
| 2005/0191505 A1 * | 9/2005 | Akarsu et al. .................. | 428/469 |
| 2006/0141223 A1 | 6/2006 | Oles et al. | |
| 2006/0147675 A1 | 7/2006 | Nun et al. | |
| 2006/0156475 A1 | 7/2006 | Oles et al. | |
| 2006/0172641 A1 | 8/2006 | Hennige et al. | |
| 2007/0254178 A1 | 11/2007 | Nun | |
| 2007/0259176 A1 * | 11/2007 | Deng et al. ..................... | 428/357 |
| 2008/0020190 A1 | 1/2008 | Nun et al. | |
| 2008/0206174 A1 | 8/2008 | Bergandt et al. | |
| 2008/0233063 A1 | 9/2008 | Bergandt et al. | |
| 2008/0280050 A1 | 11/2008 | Nun et al. | |
| 2008/0280148 A1 | 11/2008 | Nun et al. | |
| 2008/0283171 A1 | 11/2008 | Nun et al. | |
| 2008/0292799 A1 | 11/2008 | Nun et al. | |
| 2008/0305702 A1 | 12/2008 | Nun et al. | |
| 2009/0162631 A1 | 6/2009 | Bergandt et al. | |
| 2010/0159239 A1 | 6/2010 | Nun et al. | |
| 2010/0226869 A1 | 9/2010 | Bergandt et al. | |

FOREIGN PATENT DOCUMENTS

| | | |
|---|---|---|
| DE | 198 57 316 | 6/2000 |
| EP | 1 288 245 | 3/2003 |
| GB | 2137648 | * 10/1984 |
| WO | WO 2004/027517 | * 4/2004 |
| WO | WO 2005/003218 | * 1/2005 |
| WO | WO 2005/014731 | * 2/2005 |

OTHER PUBLICATIONS

Abstracts and partial machine translation of JP2003/155411, May 2003.*
U.S. Appl. No. 13/002,622, filed Jan. 4, 2011, Bergandt, et al.

* cited by examiner

*Primary Examiner* — Erma Cameron
(74) *Attorney, Agent, or Firm* — Oblon, Spivak, McClelland, Maier & Neustadt, L.L.P.

(57) ABSTRACT

The present invention relates to a process for coating substrates, which comprises the steps:
a) provision of a substrate which is not natural stone and/or natural ashlar,
b) application of a composition comprising a silane of the general formula $(Z^1)Si(OR)_3$, where $Z^1$ is R, OR or Gly (Gly=3-glycidyloxypropyl) and R is an alkyl radical having from 1 to 18 carbon atoms and all radicals R can be identical or different, oxide particles selected from among the oxides of Ti, Si, Zr, Al, Y, Sn, Zn, Ce and mixtures thereof, with bound organic radicals $SiR'_3$ being present on the surface of the oxide particles, where R' has the general formula $C_nX_{1+2n}$ where n=1 to 20, X=hydrogen and/or fluorine, all radicals R' can be identical or different and the organic radicals $SiR'_3$ being able to be split off, and an initiator to at least one surface of the substrate and
c) drying of the composition applied in step b),
and a coated substrate which can be obtained by the above-mentioned process.

21 Claims, No Drawings

METHOD FOR COATING SUBSTRATES WITH COATING SYSTEMS CONTAINING REACTIVE HYDROPHOBIC INORGANIC FILLERS

This application is a 371 of PCT/EP06/67090, filed Oct. 5, 2006.

The present invention relates to a process for coating substrates and to coated substrates which can be obtained by the abovementioned process.

There is a need in the prior art to alter or to improve the surface properties of substrates by coating them. In particular, the hardness or the resistance to aggressive substances can be improved by means of coatings. The substrates which are coated can have very different properties. Thus, the substrates can on the one hand be hard and not very flexible, for example metal, ceramic, wood or composites. On the other hand, it is also possible for flexible materials such as tiles made of a flexible polymer, nonwovens or similar substrates to be coated. In the case of all these coatings, the surface properties of the substrate are altered by the coating. Thus, it is possible to reduce the soiling tendency of the substrate by means of a coating. Secondly, it is also possible to improve the resistance of the substrates to aggressive chemicals or environmental influences.

One possible way of applying a coating is the sol-gel process. Here, a composition which subsequently cures and thus forms a stable composite is applied to the substrate. In particular, the known sol-gel process suffers from the problem that the solvent used has to be removed from the coating during curing in order to achieve curing or crosslinking of the coating. Owing to the chemical and physical processes taking place during curing, the layer formed has structural defects which can lead to cracks.

This is problematical since the sol-gel coatings customarily used are only a few 100 nm thick. The porosities within the layer formed which occur as a result of curing and crosslinking reactions then frequently lead to cracks. These resulting cracks and pores can be reduced by means of targeted sintering, i.e. heat treatment. However, at relatively high layer thicknesses there is the problem that cracks which have been formed can no longer be eliminated by further heating. When relatively thick layers are to be produced, it is therefore necessary to apply multiple coatings. One possible way of positively influencing crack formation is disclosed in U.S. Pat. No. 5,076,980, in which suitable drying conditions not only in respect of temperature but also in respect of the relative atmospheric humidity at which the coated substrate is dried were found.

WO 98/51747 discloses nanostructured shaped bodies and layers, and also processes for producing them. Here, nanosize inorganic solid particles having polymerizable and/or polycondensable organic surface groups are polymerized to form a cured shaped body. A disadvantage of the process described is that the production of the nanosize inorganic solid particles having polymerizable and/or polycondensable organic surface groups is very complicated.

There continues to be a need for surface properties of substrates to be influenced in an advantageous fashion. In particular, surface layers having a sufficiently high thickness should be able to be produced without cracks, with oxide particles which further improve the surface properties such as scratch resistance or dirt repellency being incorporated firmly into the coatings. The coating processes disclosed in the prior art have the disadvantage that either the coatings cannot be produced in a sufficient thickness or often have cracks which have an adverse effect on the surface properties or the processes use precursors which are complicated to produce but even then do not give the desired properties of the coating.

It is an object of the present invention to provide a process for coating substrates with sol-gel coatings, as a result of which high layer thicknesses can be achieved, no cracks occur in the coating, the application of multiple coatings can be avoided and the fillers which are used in such coatings are so firmly anchored in the layer that they can essentially no longer be released from the layer and the fillers used can be produced without great difficulty. A further object of the present invention is to provide coated substrates which have the abovementioned coating.

The object of the present invention is achieved by a process for coating substrates, which comprises the steps:

(a) provision of a substrate which is not natural stone and/or natural ashlar, (b) application of a composition comprising a silane of the general formula $(Z^1)Si(OR)_3$, where $Z^1$ is R, OR or Gly (Gly=3-glycidyloxypropyl) and R is an alkyl radical having from 1 to 18 carbon atoms and all radicals R can be identical or different, oxide particles selected from among the oxides of Ti, Si, Zr, Al, Y, Sn, Zn, Ce and mixtures thereof, with bound organic radicals $SiR'_3$ being present on the surface of the oxide particles, where R' has the general formula $C_nX_{1+2n}$ where n=1 to 20, X=hydrogen and/or fluorine, all radicals R' can be identical or different and the organic radicals $SiR'_3$ are able to be split off, and an initiator to at least one surface of the substrate and c) drying of the composition applied in step b).

The process of the present invention is not limited to any specific substrates, with the exception that the substrate is not natural stone and/or natural ashlar. The term "natural stone and/or natural ashlar" refers to substrates which consist of stones of natural origin or comprise such stones. Natural stones or natural ashlars are, for example, stones which are of natural origin and can be used for the erection or production of buildings, masonry walls, roofs, floors, sanitary facilities, kitchens or paths. In a preferred embodiment, the substrate is not stone. The term "stone" refers both to stones of natural origin and to artificial stones.

The substrate which is to be coated can be an open-pored or closed-pored substrate. The substrate is preferably selected from among wood, metal, ceramic, composite, polymer, tiles, nonwoven, glass and mixtures of the abovementioned substrates.

The substrate can preferably be a floor covering comprising plastic, carpet flooring or carpet, skirting board, window (in particular window frames, window ledges, glazing of glass or plastic and window handles), Venetian blinds, roller blinds, doors, door handles, fittings in the kitchen, bathroom and WC, shower cubicles, sanitary cells, WC stalls, pipes, radiators, mirrors, light switches, wall and floor tiles, lighting, letterboxes, roofing tiles, guttering, antennae, satellite dishes, handrails on stairs and escalators, architectural glazing, sun collectors, winter gardens, walls of elevators. However, it is also possible for the substrate to be a means of conveyance and transport (for example passenger car, goods vehicle, bus, motorcycle, moped, bicycle, railroad train, streetcar, ship and aircraft) or a part thereof.

The substrate is particularly preferably a headlamp, interior or exterior mirror, windshield, rear window, side window, splashguard of a bicycle or motorcycle, plastic windshield of motorcycles, instruments of motorcycles, seats, saddles, door handles, steering wheels, wheel rims, tank filling ports (in particular for diesel), number plates, pack racks, roof containers for passenger cars and also cockpits. As an alternative, the substrate can be a piece of equipment, apparatus or machine for commercial or industrial purposes and research or a part thereof. Preference is also given to molds (for example casting molds, in particular ones made of metal), powder funnels, packaging plants, extruders, water wheels, rollers, conveyor belts, printing machines, printing screens, dispensing machines, (machine) housings, injection-molded parts, boring heads, turbines, pipes (interior and exterior), pumps, saw blades, coverings (for example for balances), keyboards, switches, buttons, ball bearings, shafts, screws, displays, solar cells, solar units, tools, tool handles, containers for liquids, insulators, capillaries, lenses, laboratory equipment (for example chromatography columns and exhausts) and computers (in particular housings and monitor screens). In addition, the substrate can be a household article and piece of equipment for household use, or a part thereof, for example furniture veneers, furniture boards, garbage bins, WC brushes, table tops, crockery (for example of porcelain and stoneware), glassware, cutlery (for example knives), trays, pans, pots, baking tins, kitchen utensils (for example cooking spoons, graters, garlic presses, etc.), hobs, hotplates, ovens (interior and exterior), flower vases, coverings of wall clocks, DP equipment (in particular VDUs), stereo equipment, housings of (electric) household appliances, glass for picture frames, Christmas tree decorations, wallpaper, lamps and lights, upholstered furniture, articles made of leather, equipment, appliances and auxiliaries for play, sport and leisure, garden furniture, garden equipment, greenhouses (in particular glazing), tools, playground equipment (for example slides), balls, air mattresses, tennis rackets, table tennis bats, table tennis tables, skis, snowboards, surfboards, golf clubs, dumbbells, seats in parks, on playgrounds, etc., motorcycle clothing, motorcycle helmets, ski suits, ski boots, ski goggles, crash helmets for skiers, diver clothing, diver goggles, instruments, auxiliaries and apparatuses for medical purposes and sick persons, prostheses (in particular for limbs), implants, catheters, artificial intestinal outlets, dental braces, tooth replacement, spectacles (glasses and frames), medical cutlery (for operations and dental treatments), plaster bandages, fever thermometers, wheelchairs and hospital equipment in general. Further articles and parts thereof can also advantageously be coated by means of the abovementioned process, for example jewelry, coins, works of art (for example paintings), book bindings, urns, signs (for example traffic signs), illuminated advertising, traffic lights, CDs, bad weather clothing, textiles, letterboxes, telephone booths, waiting shelters for public transport, protective goggles, protective helmets, packaging films (for example for packaging foods), telephones, gaskets for water faucets, all articles in general produced from rubber or a polymer, bottles, light-, heat- or pressure-sensitive recording materials (before or after recording, for example photos) and church windows or windows in general.

It is also possible to use the process of the present invention to produce optical filters, for example antireflection and reflection filters in the field of the spectacles industry, displays, VDUs, semiconductor fibers, microlens coatings, solar cells, "damage-resistant" laser layers, from the substrate. In addition, holographic layers can also be applied to the substrate, for example optical waveguide systems, for information storage, laser couplers, waveguides, decoration and architecture. Embossable layers, for example antimirroring systems, focussing in detector fields, illumination of flat VDUs, imaging in photocopiers, fiber optics (injection of light), can be applied to the substrate. Alternatively, the process can advantageously be used for lithography: for example production of microoptical elements such as waveguides, grids, pinholes, diffraction gratings, point gratings and in the field of display technology, fiber-chip coupling and imaging optics.

In addition, the abovementioned process can preferably be used to apply layers which can be burnt out, for example color filters on metals, interference filters on glass, for example bandpass filters, antireflection filters, absorption filters and beam division.

In a preferred embodiment, R in the general formula $(Z^1)Si(OR)_3$ is an alkyl radical having 1, 2, 3, 4, 5, 6, 7, 8, 9, 10, 11, 12, 13, 14, 15, 16, 17 and/or 18 carbon atoms.

The composition of step b) preferably comprises a second silane of the general formula $(Z^2)_z Si(OR'')_{4-z}$, where R'' is an alkyl radical having from 1 to 6 carbon atoms and $Z^2$ is $H_a F_b C_n$, where a and b are integers, all radicals R'' can be identical or different, a+b=1+2n, z=1 or 2 and n is from 1 to 16, or when $Z^1$ is Gly, $Z^2$ is Am (Am=3-aminopropyl), and z=1. n is preferably 1, 2, 3, 4, 5, 6, 7, 8, 9, 10, 11, 12, 13, 14, 15 and/or 16. In a preferred embodiment, R'' in the general formula $(Z^2)Si(OR'')_3$ is an alkyl radical having 1, 2, 3, 4, 5, 6, 7, 8, 9, 10, 11, 12, 13, 14, 15 and/or 16 carbon atoms.

In a more preferred embodiment, the composition of step b) comprises 3-glycidyloxypropyltriethoxysilane and/or 3-glycidyloxypropyltrimethoxysilane as silane and/or 3-aminopropyltrimethoxysilane and/or 3-aminopropyltriethoxysilane as second silane.

The composition of step b) preferably comprises tetraethoxysilane as silane and a silane of the formula $(H_a F_b C_n)_z Si(OR'')_{4-z}$, where a and b are integers, a+b=1+2n, z is 1 or 2, n is from 1 to 16 and all radicals R'' can be identical or different, with all radicals R'' preferably being identical and containing from 1 to 16 carbon atoms, as second silane. n is preferably 1, 2, 3, 4, 5, 6, 7, 8, 9, 10, 11, 12, 13, 14, 15 and/or 16. In a preferred embodiment, R in the general formula $(Z^2)Si(OR'')_3$ is an alkyl radical having 1, 2, 3, 4, 5, 6, 7, 8, 9, 10, 11, 12, 13, 14, 15 and/or 16 carbon atoms.

In a more preferred embodiment, the composition of step b) comprises tetraethoxysilane, methyltriethoxysilane, octyltriethoxysilane, and/or hexadecyltrimethoxysilane as silane and/or 3,3,4,4,5,5,6,6,7,7,8,8-tridecafluorooctyltriethoxysilane as second silane.

The initiator present in the composition of step b) can be an acid or a base. The initiator is preferably an aqueous acid or base.

In a preferred embodiment, the initiator which is preferably an acid or base is an acid or base which is volatile under the drying conditions of step c). In this context, this means that the initiator is substantially volatilized under the drying conditions of step c). Thus, the initiator is preferably essentially no longer detectable, preferably no longer detectable, after completion of drying.

In a more preferred embodiment, the initiator decomposes under the drying conditions of step c). The acid or base present as initiator in the composition preferably decomposes under the drying conditions of step c). The decomposition of the initiator or of the acid or base is preferably a thermal decomposition. Thus, the initiator is preferably essentially no longer detectable, preferably no longer detectable, in the dried coating after completion of drying.

The acid is preferably selected from among nitric acid, formic acid, hydrochloric acid, acetic acid, propionic acid, phosphoric acid, oxalic acid or mixtures thereof.

If an acid is used as initiator, preference is given to using such an amount of acid that the sol obtained has a calculated pH of from 2 to 6. If a base is used as initiator, preference is given to using such an amount of base that the sol obtained has a calculated pH of from 8 to 11. The addition of the aqueous base or acid is preferably carried out in such a way that the molar ratio of water to compounds of the formula $(Z^1)_1Si(OR)_3$, in particular $GlySi(OR)_3$, in the preparation of the mixture is from 100 000:1 to 10:1, preferably from 1000:1 to 100:1.

At least one further additive can be present in the composition of step b). As additives, it is possible to use all compounds with which those skilled in the art are familiar in the context of sol-gel coatings.

The surface of the oxide particles present in the composition of step b) is preferably hydrophobic. In a preferred embodiment, the organic group $SiR'_3$ present on the surface of the oxide particles is partly hydrolyzed, i.e. split off, under the reaction conditions of the sol-gel formation in step b) of the present invention. The radicals $SiR'_3$ bound to the surface of the oxide particles are preferably split off by the initiator. This preferably forms reactive centers which react with the organic silicon compounds of the composition from step b). These organic silicon compounds are covalently bound to the oxide particles by means of, for example, —O— bonds during curing. As a result, the oxide particles are covalently crosslinked with the curing sol-gel. The thickness of the cured layer can surprisingly be increased further in this way and the oxide particles are incorporated very firmly into the coating, so that they are very firmly anchored in the coating.

In the organic radicals $SiR'_3$, R' preferably has the general formula $C_nX_{1+2n}$ where n=1, 2, 3, 4, 5, 6, 7, 8, 9, 10, 11, 12, 13, 14, 15, 16, 17, 18, 19 and/or 20. The groups bound to silicon atoms are preferably methyl, ethyl, propyl, butyl and/or pentyl groups. In a particularly preferred embodiment, trimethylsilyl groups are bound to the surface of the oxide particles. The organic radicals can preferably be split off.

The radicals $SiR'_3$ bound to the surface of the oxide particles are preferably bound to the oxide particles essentially via a bond containing oxygen, with the bond preferably being a covalent bond.

The oxide particles can have a mean particle size of from 10 to 1000 nm, preferably from 20 to 500 nm, more preferably from 30 to 250 nm.

If the coating is to be transparent and/or colorless, preference is given to using only oxide particles which have a mean particle size of from 10 to 250 nm. The mean particle size is based on the size of the primary particles or, if the oxides are present as agglomerates, on the size of the agglomerates. The particle size is determined by light-scattering methods, for example by means of an instrument of the HORIBA LB 550® type (from Retsch Technology).

The composition of step b) can be applied to the substrate by various generally known methods. In particular, the composition can be applied by, for example, doctor blade coating, painting, rolling, spraying or dipping the substrate into the composition.

In a more preferred embodiment, the composition is treated thermally at a temperature of >40° C. in step b) before application to the substrate. The thermal treatment is preferably carried out at a temperature of >50° C., more preferably >60° C. and most preferably >70° C. In a preferred embodiment, the composition is boiled under reflux before application to the substrate. The thermal treatment of the composition is carried out for a period of preferably from 1 minute to 4 hours, more preferably from 30 minutes to 3 hours and most preferably from 1 hour to 2 hours. In a more preferred embodiment, the thermal after-treatment can, depending on the polymer used, take from 1 minute to 30 minutes and more preferably from 1 minute to 15 minutes.

The drying time of step c) is surprisingly shortened further by the thermal treatment. The thermal treatment preferably also results in formation of a denser coating which has better abrasion resistance or resistance to environmental influences and chemicals.

The drying in step c) is preferably carried out at a drying temperature of from 100° C. to 250° C. The temperature preferably remains essentially constant and preferably constant during drying in step c).

The drying of the composition in step c) can be carried out by any method known to those skilled in the art. In particular, drying can be carried out in an oven. Particular preference is given to a convection oven, an infrared field, hot air and/or a microwave radiator. In a preferred embodiment, the drying temperature is essentially constant and preferably constant during drying in step c). This means that, for example, an oven is preferably heated to the desired drying temperature and the substrate to which the composition of step b) has been applied is introduced into the preheated oven. After the desired drying time, which is necessary to dry and, if appropriate, cure the applied composition, the coated substrate is removed from the drying apparatus.

The drying times are not restricted further. However, they should be selected so that complete removal of the solvent and, if appropriate, of the initiator from the applied coating is possible. The drying time in step c) is preferably from 1 minute to 3 hours.

In a preferred embodiment, the composition is applied to the substrate in step b) in such an amount that, after drying in step c), a layer of the dried composition having a thickness of from 0.05 to 10 μm is present on the substrate. A layer having a thickness of from 0.1 μm to 9 μm, more preferably from 0.2 μm to 8 μm and most preferably from 0.3 μm to 7 μm, is preferably present on the dried substrate.

The coated substrate of the present invention surprisingly displays a very high freedom from cracks, with essentially no cracks being present in the coating in a preferred embodiment.

The chromium oxide/oil test in accordance with DIN EN ISO 10 545-14 is a test for confirming freedom from cracks. Here, chromium oxide, which has a green color, is applied to the coating to be tested. After removal of the chromium oxide using the procedure indicated in DIN EN ISO 10 545-14, the degree of coloration of the coating is an indicator of the extent to which a surface is free of pores and cracks. The coatings according to the invention have a very highly pore- and crack-free surface, so that the chromium oxide/oil can be removed leaving almost no residue.

Thus, the substrates coated by the process of the present invention have an improved coating compared to the coatings of the prior art. In particular, it is surprisingly possible to apply thicker coatings, with multiple application in a multiple coating process being avoided.

In a preferred embodiment, at least one further coating can be applied before application of the composition in step b). This coating can, for example, be in the form of printing, e.g. a design print.

In a more preferred embodiment, at least one further coating can be applied after application of the composition in step b). This further coating can also be applied after drying in step c). This further coating can, for example, be in the form of printing, e.g. a design print.

Thus, a coated substrate which can be obtained by the process described here has a variety of possible applications. In particular, avoidance of multiple coatings makes it possible to produce coated substrates more efficiently. The oxide particles used can be produced easily or are available in industry. The oxide particles are anchored very firmly in the coating, so that, surprisingly, they can essentially no longer be removed from the coating by mechanical means. The substrate which has been coated in this way has an increased scratch resistance and improved chemical resistance.

EXAMPLES

Example 1 According to the Invention 11.2 g of 3-glycidyloxypropyltriethoxysilane, 1 g of nitric acid (1% strength dilution in water) and 16.3 g of a 20% strength dispersion of Aerosil® R8200 (Degussa AG, structurally modified silica having SiMe$_3$ groups on the surface) in ethanol are mixed by stirring. 9.5 g of 3-aminopropyltriethoxysilane are subsequently added with stirring and the mixture is stirred for another 24 hours.

The sol obtained is applied to a substrate by means of a doctor blade and dried at 150° C. for 15 minutes. The coating obtained is free of cracks and the resistance of the coating to chemical reagents is very good.

Example 2 According to the Invention 5.3 g of 3-glycidyloxypropyltriethoxysilane, 0.5 g of nitric acid (1% strength dilution in water) and 5.43 g of Aerosil® R8200 (20% strength in ethanol, Degussa AG, structurally modified silica having SiMe$_3$ groups on the surface) and 2.71 g of ethanol are mixed by stirring. 4.78 g of 2-aminoethyl-3-aminopropyltriethoxysilane are subsequently added with stirring and the mixture is stirred for another 24 hours.

The sol obtained is applied to a substrate so as to give a 25 μm thick layer (wet) which after drying has a thickness of 3 μm. The layer obtained is free of cracks, transparent and has a high resistance to chemical attack. The scratch resistance of the layer is greater than F>15N.

COMPARATIVE EXAMPLE 11.2 g of 3-glycidyloxypropyltriethoxysilane, 1 g of nitric acid (1% strength dilution in water) and 16.3 g of ethanol are mixed by stirring. 9.5 g of 3-aminopropyltriethoxysilane are subsequently added with stirring and the mixture is stirred for another 24 hours.

The sol obtained is applied to a substrate by means of a doctor blade and is dried at 150° C. for 15 minutes.

The coating obtained has many cracks, does not adhere well to the substrate and displays only a low chemical resistance. Substances which produce stains (e.g. ketchup, mustard, tea) also attack the coating and irreversibly destroy the coating.

The invention claimed is:

1. A process for coating a substrate comprising:
   a) applying a composition comprising:
   a silane of the formula $(Z^1)Si(OR)_3$, where $Z^1$ is R or OR and R is an alkyl radical having from 1 to 18 carbon atoms wherein all radicals R in the formula $(Z^1)Si(OR)_3$ are identical or different,
   oxide particles selected from the group consisting of Ti, Zr, Al, Y, Sn, Zn, Ce and mixtures thereof, with bound organic radicals SiR'$_3$ being present on the surface of the oxide particles, where R' has the formula $C_nX_{1+2n}$ where n=1 to 20, X=hydrogen, all radicals R' in the formula SiR'$_3$ are identical or different, and the organic radicals SiR'$_3$ are able to be split off, and
   an initiator
   to at least one surface of a substrate which is not natural stone and/or natural ashlar and
   b) drying the composition applied in a).

2. The process as claimed in claim 1, wherein the substrate is an open-pored or closed-pored substrate which is selected from the group consisting of wood, metal, ceramic, composite, polymer, tiles, nonwoven, glass and mixtures of the abovementioned substrates.

3. The process as claimed in claim 1, wherein the composition further comprises a second silane of the formula $(Z^2)_zSi(OR'')_{4-z}$, where R'' is an alkyl radical having from 1 to 16 carbon atoms and $Z^2$ is $H_aF_bC_n$, where a and b are integers, all radicals R'' of the formula $(Z^2)_zSi(OR'')_{4-z}$ are identical or different, a+b=1+2n, z=1 or 2 and n is from 1 to 16.

4. The process as claimed in claim 3, wherein the second silane is 3-aminopropyltrimethoxysilane and/or 3-aminopropyltriethoxysilane.

5. The process as claimed in claim 3, wherein the silane is tetraethoxysilane and the second silane has a formula $(H_aF_bC_n)_zSi(OR'')_{4-z}$, where a and b are integers, a+b=1+2n, z is 1 or 2, n is from 1 to 16 and all radicals R'' are identical or different.

6. The process as claimed in claim 3, wherein the silane is tetraethoxysilane, methyltriethoxysilane, octyltriethoxysilane and/or hexadecyltrimethoxysilane; and/or the second silane is 3,3,4,4,5,5,6,6,7,7,8,8,8-tridecafluorooctyltriethoxysilane.

7. The process as claimed in claim 1, wherein the initiator is an acid or a base.

8. The process as claimed in claim 7, wherein the acid or base is an acid or base which is volatile under the drying conditions of b).

9. The process as claimed in claim 7, wherein the acid or base decomposes under the drying conditions of b).

10. The process as claimed in claim 7, wherein the initiator is an acid selected from the group consisting of nitric acid, formic acid, hydrochloric acid, acetic acid, propionic acid, phosphoric acid, oxalic acid and mixtures thereof.

11. The process as claimed in claim 1, wherein the composition further comprises at least one additive.

12. The process as claimed in claim 1, wherein the surface of the oxide particles is hydrophobic.

13. The process as claimed in claim 1, wherein the radicals SiR'$_3$ bound to the surface of the oxide particles are essentially bound to the oxide particles via a bond containing oxygen.

14. The process as claimed in claim 1, wherein the radicals SiR'$_3$ bound to the surface of the oxide particles are split off by the initiator.

15. The process as claimed in claim 1, wherein the composition is treated thermally at a temperature of greater than 40° C. in a) before application to the substrate.

16. The process as claimed in claim 1, wherein the composition is applied to the substrate in such an amount that, after drying, a layer of the dried composition having a thickness of from 0.05 to 10 μm is present on the substrate.

17. The process as claimed in claim 1, wherein the drying is carried out at a drying temperature of from 100° C. to 250° C.

18. The process as claimed in claim 1, wherein the drying temperature is constant during drying.

19. The process as claimed in claim 1, wherein the process further comprises application of at least one coating on said substrate before application of the composition.

20. The process as claimed in claim 1, wherein the process further comprises application of at least one coating on said substrate after application of the composition.

21. A coated substrate obtained by the process as claimed in claim 1.

* * * * *